July 13, 1965  MUTSUMI MISAWA  3,195,146
INTERMITTENT FILM-FEEDING MEANS FOR MOTION PICTURE CAMERAS
Original Filed Oct. 24, 1960  3 Sheets-Sheet 1

INVENTOR.
Mutsumi Misawa
BY
Michael J. Striker
ATTORNEY.

July 13, 1965 MUTSUMI MISAWA 3,195,146
INTERMITTENT FILM-FEEDING MEANS FOR MOTION PICTURE CAMERAS
Original Filed Oct. 24, 1960 3 Sheets-Sheet 2
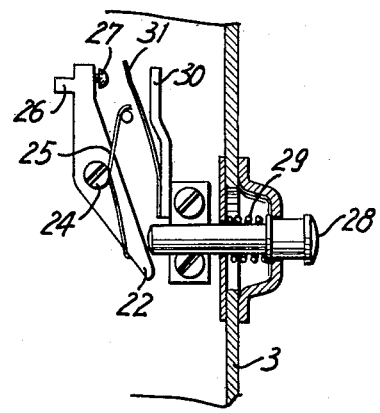
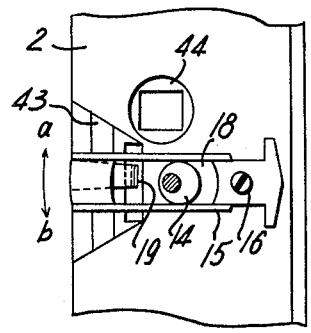
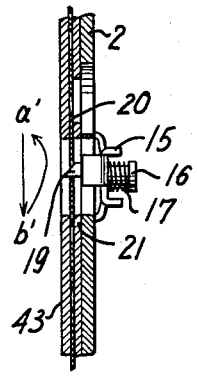
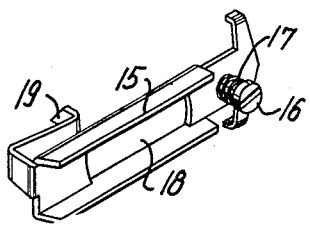
INVENTOR.
Mutsumi Misawa
BY
Michael J. Striker
ATTORNEY.

INVENTOR.
Mutsumi Misawa
BY
Michael J. Striker
ATTORNEY.

Patent 3,195,146

3,195,146
INTERMITTENT FILM-FEEDING MEANS FOR MOTION PICTURE CAMERAS

Mutsumi Misawa, Tokyo, Japan, assignor to Seiko Denki Kogyo Kabushiki Kaisha, Tokyo, Japan
Original application Oct. 24, 1960, Ser. No. 64,601. Divided and this application Nov. 13, 1962, Ser. No. 236,839
1 Claim. (Cl. 352—196)

The instant application is a division of copending application 64,601, filed October 24, 1960, and entitled Motion Picture Camera.

One of the objects of the present invention is to provide for a motion picture camera a structure for intermittently advancing the film thereof.

Another object of the present invention is to provide a motion picture camera with a compact, rugged claw assembly which is simple and inexpensive and which will operate reliably to advance the film intermittently.

It is also an object of the present invention to provide a motion picture camera with a claw structure wherein the claw driving structure need only oscillate the claw back and forth about an axis parallel to the optical axis while the movement of the claw transversely with respect to the film into and out of the perforations thereof takes place automatically by cooperation of the claw itself with the film itself.

With the above objects in view, the invention includes, in a motion picture camera, a housing having in its interior a transverse wall in a plane normal to the optical axis and formed with a film gate through which the optical axis passes. The shutter means is turnably carried at least in part by this wall for controlling the exposure of the film through the film gate, and the turnable shutter means has a rear face which is directed toward the transverse wall and which carries a cam positioned eccentrically with respect to the axis of rotation of the shutter means. A claw means is located between the transverse wall and the shutter means and is actuated by the cam during rotation of the shutter means for advancing the film.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

FIG. 3 illustrates a manually operable lever means of the invention on an enlarged scale as compared to FIG. 1;

FIG. 4 shows a transverse portion of a partition of the invention as seen when viewing the front face of this transverse portion, FIG. 4 illustrating the film gate as well as the claw means of the invention;

FIG. 5 is a longitudinal section adjacent the left edge of FIG. 4 and extending vertically, FIG. 5 illustrating the manner in which a tooth of the claw means cooperates with the film to advance the latter;

FIG. 6 is a perspective illustration of an elongated member of the claw means of the invention;

Figure 1:
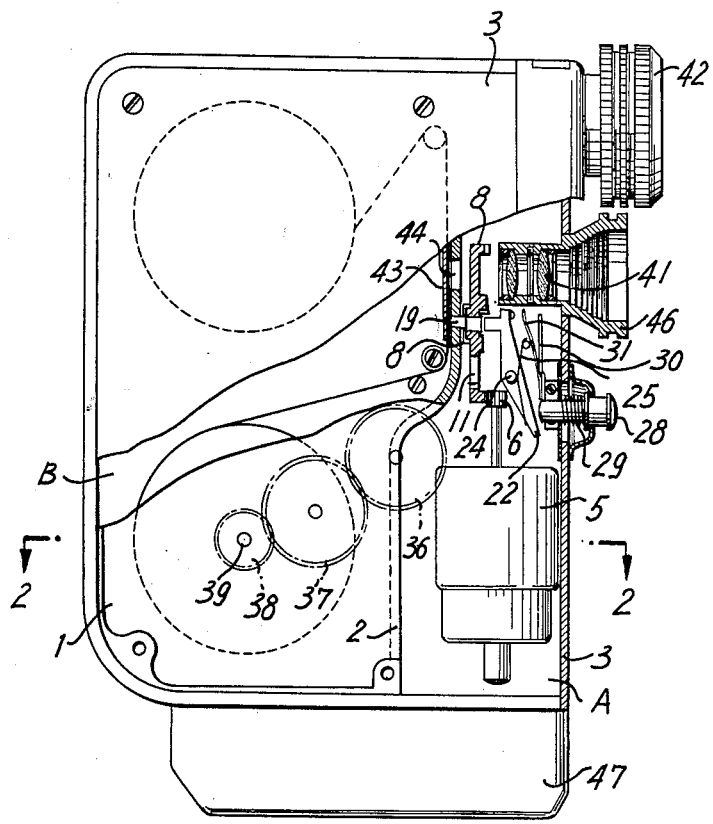
FIG. 1 is a partly sectional side elevation of a camera constructed according to the present invention.
Figure 2:
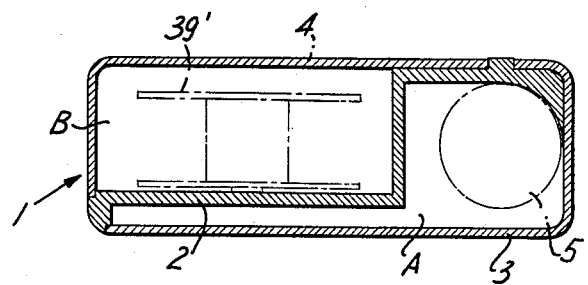
FIG. 2 is a sectional plan view taken along line 2—2 of FIG. 1 in the direction of the arrow.

Referring now to the drawings, the structure of the housing of the motion picture camera of the invention and the partition in the interior thereof is shown most clearly in FIGS. 1 and 2. Thus, it will be seen that the motion picture camera is provided with a housing 1 of a generally rectangular configuration. This housing 1 has narrow front and rear walls, as is apparent from FIG. 2, and a pair of opposed side walls extending between the front and rear walls, and of course the housing has top and bottom walls. Within this generally rectangular housing, which has the general shape and size of a book, is located a partition 2 which, in accordance with the present invention, is stepped, in the manner shown in FIG. 2. Thus, the partition 2 has a frontside wall portion engaging directly a side wall of the housing 1, and a rear side wall portion which is spaced from and parallel to the opposite side wall portion of the housing 1, this rear part of the partition 2 extending all the way up to the rear wall of the housing 1. Between its front and rear side portions the partition 2 has a transverse portion in a plane normal to the optical axis, as is apparent from FIG. 2, and it is this transverse portion which is formed with the film gate 44 shown in FIGS. 1 and 4. The partition 2 divides the interior of the housing 1 into a mechanism chamber A and a magazine chamber B, and these chambers are maintained separate from each other by the partition 2. The rear wall of the housing 1 together with part of the side wall which encloses the magazine chamber B forms an angular wall unit 4 which is removable from the partition 2 and capable of being releasably fastened thereto in a suitable way, so that by removing the wall 4 access may be had to the magazine chamber B for introducing and removing film therefrom. In the same way, the housing is provided with a front wall portion and a side wall portion defining part of the mechanism chamber A, and this also forms an angular wall unit 3 capable of being removed upon removal of screws some of which are visible in FIG. 1, so that in this way access may be had when necessary to the mechanism chamber A.

To the bottom wall of the housing 1 is fixed an enclosure 47 for a battery such as a dry-cell battery which is removable from the compartment 47 in any suitable way not forming part of the present invention and which is connected electrically with an electric motor 5 also in a well known manner not forming part of the present invention. This electric motor 5 is located in a lower part of the chamber A adjacent the front wall of the camera housing and is carried by the front portion of the partition 2, as is evident from FIG. 2. The electrical motor 5 is a constant speed D.C. motor which is driven from the battery at a constant speed and which serves to drive all of the moving parts of the camera. Thus, as is apparent from FIGS. 1 and 7, the motor 5 has its drive shaft fixed directly to a pinion 6 which thus is directly driven by the motor 5.

Figure 7:
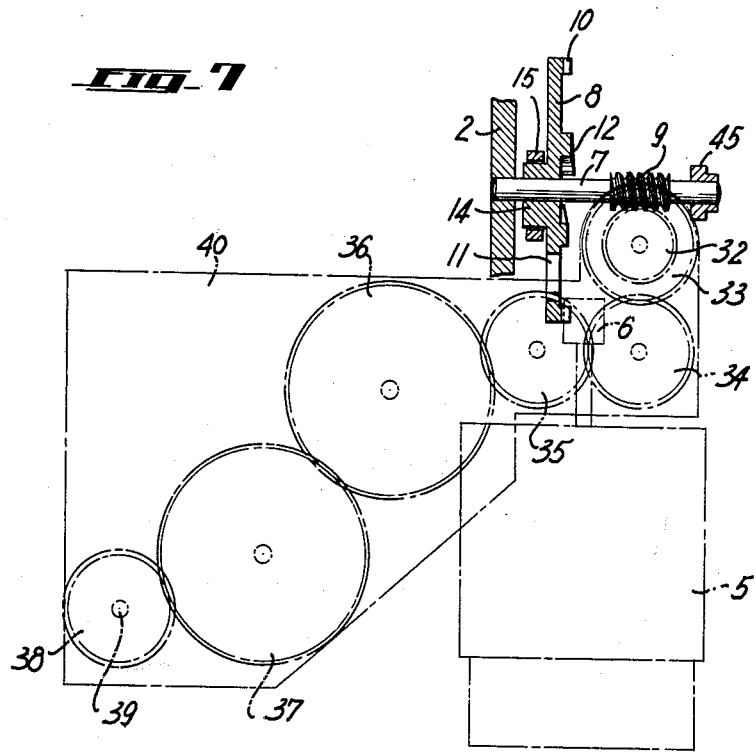
FIG. 7 is a partly diagrammatic illustration of the gear train which serves to transmit the drive to the take-up spool of the magazine.
Figure 8:
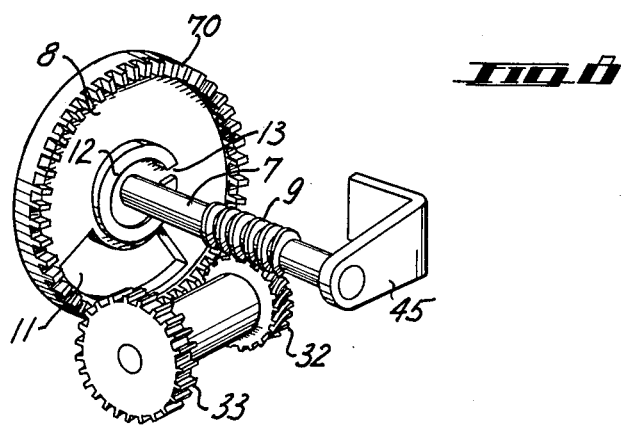
FIG. 8 is a perspective view on an enlarged scale of the structure which drives the gear train from the rotary shutter means of the invention.

This pinion 6 serves to drive the rotary shutter means of the invention. This rotary shutter means of the invention includes the shaft 7 which is shown in FIGS. 7 and 8. The shaft 7 extends parallel to the optical axis but is located at an elevation lower than the optical axis. The rear end of the shaft 7 is supported directly by an opening in the transverse portion of the partition 2, so that the latter forms one bearing for the shaft 7, and the front end of the shaft 7 is supported for rotation by a bearing formed by part of a bracket 45 which is fixed to the front wall of the camera. The rotary shaft 7 fixedly carries the disc 8 which forms the shutter disc of the invention, and it will be noted that the shaft 7 is provided with a worm 9 which rotates with the shaft 7 for a purpose described below. The shutter disc 8 is formed at its front face with the gear teeth 10 which are directed toward the front of the camera, so that the shutter disc 8 also forms a ring gear, and the pinion 6 meshes directly with the gear 10 so as to directly rotate the shutter disc 8. The shutter disc 8 is formed with an arcuate aperture 11 which forms the cutout through which the film is exposed when this aperture 11 is aligned with the film gate 44 formed in the transverse portion of the partition 2.

At its front face which is directed toward the front wall of the camera the shutter disc 8 fixedly carries a cam 12 which may be integral with the shutter disc 8, and this cam 12 has a front face of a helical configuration, as is apparent particularly from FIGS. 1, 7, and 8. The helical cam 12 is interrupted by a notch 13.

At its rear face which is directed toward the transverse portion of the partition 2 the shutter disc 8 fixedly carries a cam 14 which may be integral with the disc 8 and which is in the form of an eccentric cam, as is particularly apparent from FIG. 4. This cam 14 rotates with the disc 8, the latter being fixed to the shaft 7, as was pointed out above, so that through the disc 8 the shaft 7 is driven from the motor 5.

The eccentric cam 14 forms the cam of the claw means of the invention and actuates this claw means. The structure of the claw means is most clearly shown in FIGS. 4–6. Thus, the claw means includes an elongated member 15 having upper and lower flanges between which the cam 14 is located. A pivot pin in the form of a screw 16 is threadedly carried by the transverse portion of the partition 2, and this pivot pin 16 is located adjacent the right end of the elongated member 15, as viewed in FIGS. 4 and 6. A spring 17 is located between the head of the screw 16 and the elongated member 15 so as to urge the latter at its right end portion, as viewed in FIGS. 4 and 6, toward the transverse portion of the partition 2, and the opening of the member 15 through which the pivot pin 16 passes has sufficient clearance with respect to the pivot pin so that the left end portion of the member 15, as viewed in FIGS. 4 and 6 can have a limited degree of turning movement toward and away from the front wall of the camera.

Between its upper and lower flanges the elongated member 15 formed with a cutout 18 which receives the cam 14. At its left end portion, as viewed in FIGS. 4 and 6, the elongated member 15 of the claw means of the invention is provided with the springy claw toothed 19, this tooth 19 being formed by an extension of the member 15 which is bent first toward the rear of the camera then in a direction parallel to the flanges of the member 15 and terminates finally in a rearwardly directed portion which has an end face directed downwardly toward the rear of the camera, as is clearly apparent from FIG. 5. The transverse portion of the partition 2 is formed beneath the film gate 44 and to one side thereof with a cutout through which the claw tooth 19 passes, as is shown most clearly in FIG. 4, and during rotation of the cam 14 with the shutter means the left end portion of the claw means will reciprocate in the manner indicated by the arrow a–b of FIG. 4. The apertures along the side of the film strip are aligned with the tooth 19, and as is apparent from FIG. 5 when this tooth 19 is in one aperture and moves in a downward direction as indicated by the arrow a′–b′ of FIG. 5, the film will be advanced downwardly. On the other hand, due to the inclination of the rear end face of the tooth 19, when the claw is reciprocated upwardly by the cam 14 the tooth 19 will ride out of the aperture of the film and will move along the film to the next higher aperture and snap into the next higher aperture so that during the next downward movement of the claw the film will again be advanced by a distance equal to one film frame. The manner in which the tooth 19 moves out of one aperture up into the next aperture of the film is shown by the upwardly directed curved arrow b′–a′ in FIG. 5. As is apparent from FIG. 5, the film gate is actually formed in a separate plate which is fixed to the rear face of the transverse portion of the partition 2, and the film 20 is shown in FIG. 5 engaging the plate which is formed with the film gate. A conventional pressure plate 43 maintains the film in the focal plane, and FIG. 5 shows the apertures 21 of the film which are adapted to be successively engaged by the tooth 19 of the claw means of the invention for advancing the film in a step-wise fashion in the manner described above.

A manually operable lever means is provided for stopping and starting the operation of the camera, and this manually operable lever means includes the lever 22 shown in FIGS. 1 and 3. This lever 22 is pivotally supported by a screw member 24 which is threaded into the forward portion of the partition 2, and a spring 25, in the form of a wire spring, is coiled about the pivot pin 24, engages with one end against a lower portion of the lever 22, and engages with the upper end a stationary pin carried by the partition 2, so that the spring 25 urges the lever 22 to turn in a counterclockwise direction, as viewed in FIG. 3. Thus, the spring 25 will urge the projection 26 of the lever 22 in a rearward direction. When the camera does not operate the projection 26 is located in the notch 13 of the cam 12, and as is apparent from FIG. 8 the aperture 11 of the shutter disc 8 is at this time located at the lowest portion of the shutter disc while the film gate 44 is aligned with an upper portion of the shutter disc (FIG. 1), so that at this time the film gate is closed and the film cannot be exposed to light. The upper portion of the lever 22 also carries an electrical contact 27 which is insulated from the remainder of the lever 22 and which is connected into the circuit of the motor 5 and the battery in the compartment 47 so as to close this circuit in the manner described below.

The manually operable lever means includes in addition a manually engageable member 28 in the form of a plunger accessible at the front of the camera and urged forwardly by a spring 29, as indicated in FIG. 3. When the manually engageable member 28 is pushed inwardly toward the rear by the operator, the left end of the member 28, as viewed in FIG. 3, will engage the lever 22 to turn the latter in a clockwise direction in opposition to the spring 25, and in this way the projection 26 will be moved out of the notch 13 so as to free the shutter disc 8 for rotation. A springy electrical contact 31 is located in the path of movement of the contact 27 to be engaged thereby, and these contacts 27 and 31 form a switch which is automatically closed upon turning of the manually operable lever means 22 in a clockwise direction by the operator, as viewed in FIG. 3, and when this switch 27, 31 is closed the motor 5 is energized. The electrical contact 31 is carried by a bracket 30 which serves the additional purpose of grounding the contact 31. Thus, when the plunger 28 is actuated by the operator the shutter will be released for rotation and the electrical motor will be energized so as to rotate the shutter.

As was pointed out above, the shaft 7 of the rotary shutter means of the invention rotates with the disc 8, and this shaft 7 carries the worm 9 from which the drive is taken for turning the take-up spool 39′ indicated diagrammatically in FIG. 2. Referring to FIG. 7, a wall 40 having the configuration shown in dot-dash lines in FIG. 7 is fixed to the rear side portion of the partition 2 in the space between the partition 2 and the side wall of the housing which appears at the lower part of FIG. 2, and this wall 40 extends forwardly beyond the transverse portion of the partition 2, as is apparent from FIG. 7. This forward portion of the wall 40 is formed with an opening which serves as a bearing for a shaft which extends through this opening and which is fixed at one end to a worm wheel 32 and at its opposite end to a gear 33, the elements 32 and 33 being located on opposite sides of the wall 40 at the upper right portion thereof, as viewed in FIG. 7. The worm wheel 32 meshes with the worm 9 so that when the shaft 7 turns the worm wheel 32 will turn and will thus rotate the gear 33 which is located between the wall 40 and the side wall of the camera which appears at the lower part of FIG. 2. This gear 33 meshes with a train of gears shown in FIG. 7 and all rotatably carried by the wall 40, the gear 33 being the first of the train of gears and meshing with the gear 34 which transmits the drive through the gears 35–38, the gear 38 being the last gear of the gear train, and all of these gears are located in the space between the rear portion of the partition 2 and the side wall of the housing 1 which appears at the lower part of FIG. 2. The last gear 38 of the gear train is fixed to the shaft 39 which not only is rotatably supported by the wall 40 but in addition passes through an opening of the partition 2 into the magazine chamber B where the shaft 39 is provided with a conventional support for the take-up spool 39' so as to drive the latter.

The film is threaded in a conventional manner in the magazine chamber B from the supply spool which is shown diagrammatically at the upper left portion of FIG. 1 over suitable guides between the pressure plate 43 and the film gate 44 and back to the take-up spool 39'.

FIG. 1 shows the objective 41 which of course has its axis aligned with the film gate 44 and when the aperture 11 of the shutter disc 8 is between the gate 44 and the objective 41 an exposure will be made. The lenses of the objective are located in a suitable tube 46, and the camera housing is provided with a viewfinder through which the subject is viewed when operating the camera. Also, the camera is provided with an exposure meter 42 which in a well known manner automatically actuates a diaphragm extending into the lens tube 46 so as to control the exposure aperture automatically, and any suitable well known adjustment is provided for the exposure meter so as to introduce into the camera the speed of the film which is used.

The operation of the camera described above is believed to be evident. When the operator depresses the button 28 the motor 5 will be energized so as to rotate the shutter which of course has been released in the manner described above, and from the rotating shutter the claw means will be actuated as well as the gear train which drives the take-up spool. The angular position of the cam 14 with respect to the aperture 11 of the shutter disc 8 is such that when this aperture 11 is aligned with the film gate 44 the claw tooth 19 is moving upwardly toward the next upper perforation of the film and the film is stationary, so that the film remains stationary during the making of an exposure. When the film has a perforation engaged by the tooth 19 of the claw means and when the latter moves down so as to advance the film the aperture 11 is out of line with the film gate 44 so that no exposure of the film can take place during advancing of the film.

In order to stop the camera the operator simply releases the button 28 which is moved to the right by the spring 29, and the spring 25 urges the projection 26 against the helical cam 12 so that as soon as the notch 13 reaches the projection 26 the latter will snap into the notch 13 and terminate the operations.

It will be understood that each of the elements described above, or two or more together, may also find a useful application in other types of cameras differing from the types described above.

While the invention has been illustrated and described as embodied in motion picture cameras, it is not intended to be limited to the details shown, since various modifications and structural changes may be made without departing in any way from the spirit of the present invention as defined in the claim.

What is claimed as new and desired to be secured by Letters Patent is:

In a motion picture camera, in combination, an elongated channel member having a pair of parallel side walls and a third wall interconnecting said parallel side walls, said elongated channel member forming a claw of the camera; rotary eccentric cam means located between and engaging said side walls of said elongated channel member; pivot means operatively connected to said elongated channel member adjacent one end portion thereof to support the latter for turning movement about a given axis, whereby during rotation of said eccentric cam means while the latter engages said pair of side walls said elongated channel member will be oscillated about the pivot axis provided by said pivot means; and tooth means carried by said elongated channel member at an end portion thereof distant from said pivot means, said tooth means being adapted to cooperate with a film strip to intermittently advance the latter, said third wall of said elongated channel member being formed with a cutout for accommodating said cam means, said tooth means being in the form of an elongated extension of said third wall of said channel member curved backwardly upon itself and terminating in a tooth which extends away from said third wall of said channel member.

References Cited by the Examiner

UNITED STATES PATENTS

| 1,864,657 | 6/32 | Lowkrantz et al. | 88—18.4 |
| 1,923,855 | 8/33 | Victor | 88—18.4 X |
| 2,153,142 | 4/39 | Fairbanks | 88—18.4 |
| 3,063,335 | 11/62 | Bolsey | 88—18.4 |

FOREIGN PATENTS 232,186   6/26   Great Britain.

EVON C. BLUNK, *Primary Examiner.*

WILLIAM MISIEK, *Examiner.*